310-335 SR

OR 3,746,895

T 89225 ✓
X 89163 ✓
X 89379 ✓

United States

Goble

11] 3,746,895

45] July 17, 1973

[54] PIEZOELECTRIC TRANSDUCER ASSEMBLY AND STRUCTURE FOR MOUNTING PIEZOELECTRIC ELEMENT THEREIN

[75] Inventor: Ralph W. Goble, Boulder, Colo.

[73] Assignee: Sontrix, Inc., Boulder, Colo.

[22] Filed: Apr. 9, 1971

[21] Appl. No.: 132,724

[52] U.S. Cl. ..................... 310/9.4, 310/8.2, 310/8.6
[51] Int. Cl. ..................... H04r 17/00
[58] Field of Search ..................... 310/8.2, 8.5, 8.7, 310/9.1–9.4, 9.7

[56] References Cited

UNITED STATES PATENTS

| | | | |
|---|---|---|---|
| 1,692,063 | 11/1928 | Trogner | 310/9.2 |
| 3,333,122 | 7/1967 | Christian | 310/9.1 |
| 2,565,586 | 8/1951 | Bauer | 310/8.6 X |
| 2,168,809 | 8/1939 | Semple, Jr. | 310/8.6 X |
| 2,304,835 | 12/1942 | Lutzens | 310/9.4 |
| 3,518,460 | 6/1970 | Wood et al. | 310/9.4 X |
| 3,268,855 | 8/1966 | Hagey | 310/8.2 X |
| 3,577,020 | 5/1971 | Carlson | 310/9.4 |
| 3,109,111 | 10/1963 | Wiggins | 310/8.2 |

*Primary Examiner*—J. D. Miller
*Assistant Examiner*—Mark O. Budd
*Attorney*—Anderson, Spangler & Wymore

[57] ABSTRACT

A transducer assembly has a twister flexing type piezoelectric element mounted therein by structure including a pair of wirelike members positioned to extend perpendicularly to each other to clamp the element therebetween by contacting it only at selected peripheral edge points. The assembly includes a phase shifting flow restriction which eliminates destructive interference at the element's surfaces. The wirelike members are electrically conductive so as to also function as electrodes and the electrodes of the element are connected to a pair of electrical terminals included in the assembly.

13 Claims, 5 Drawing Figures

INVENTOR
RALPH W. GOBLE
BY
Anderson, Spangler & Wymore
ATTORNEY

PIEZOELECTRIC TRANSDUCER ASSEMBLY AND STRUCTURE FOR MOUNTING PIEZOELECTRIC ELEMENT THEREIN

The present invention relates to piezoelectric elements and more particularly to an improved mounting structure therefor. Further, the invention relates to an improved piezoelectric transducer assembly.

Piezoelectric elements may be made both from natural occurring materials, such as certain known crystals, and from ceramic materials in which piezoelectric behavior has been induced by a polarizing treatment. Piezoelectric elements function as transducers to convert mechanical to electrical energy and vice versa, and their performance characteristics in any particular application are significantly influenced by the manner in which they are mounted. Ideally, a piezoelectric element should be mounted to prevent any motion of the element at its mounting points in a certain predetermined direction or directions while offering no resistance to the movement of the element at these mounting points in all other directions.

Heretofore, various mounting arrangements for piezoelectric elements have been designed. Generally, these prior art mounting arrangements have had the disadvantage that they significantly restricted the movements of the piezoelectric elements they held in those directions which the piezoelectric elements should ideally have been free to move. As a result, these prior art mounting arrangements had the adverse effect of damping vibratory motion in the mounted piezoelectric elements in those directions in which they were intended to vibrate, thereby undesirably diminishing the sensitivity and output of the transducers formed by the piezoelectric elements.

It is, accordingly, an object of the present invention to provide an improved structural arrangement for mounting a piezoelectric element which closely approximates an ideal mounting so as to enhance the sensitivity and performance characteristics of the piezoelectric element.

It is further an object of the present invention to provide an improved mounting structure as set forth which is suitable for use in mounting a substantially flat piezoelectric element.

It is, additionally, an object of the present invention to provide an improved mounting structure as set forth which is operable to mount a rectangular flexing type of piezoelectric element by contacting it at selected mounting points and to limit movement of the element normal to its upper and lower faces at these mounting points while permitting substantially unrestrained transverse movement of the element so that the piezoelectric element is free to flex and vibrate in its designed manner.

It is another object of the present invention to provide an improved mounting structure as set forth in which at least a portion of the structure employed to mount the piezoelectric element also functions as electrodes.

It is also an object of the present invention to provide an improved piezoelectric transducer assembly characterized by having improved sensitivity and performance characteristics. Additional objects of the present invention reside in the specific construction of the exemplary piezoelectric transducer assembly hereinafter particularly described in the specification in conjunction with the several drawings and also in the specific construction of the structure shown and described for mounting a piezoelectric element therein.

In accomplishing these and other objects, there is provided in accordance with the present invention a rectangular piezoelectric element of the flexing type mounted within a frame by a pair of wirelike members. The wirelike members are positioned normal to each other on opposite sides of the element and also serve as electrodes. The members are tensioned to bend outward away from the element so that each wirelike member makes contact with the element only at opposite peripheral edge points. The frame with the piezoelectric element is mounted in a housing and appropriate electrical connections are provided so that the assembly may be utilized as an ultrasonic transducer. Additionally, a physical restriction to airflow which provides means for phase shifting sonic waves is constructed adjacent one side of the element to cancel out destructive interference caused by portions of the element moving simultaneously in opposite directions. Thus, there is provided an improved piezoelectric transducer assembly having a piezoelectric element mounted in an improved manner therein. The piezoelectric element is of a flexing type and is mounted in a manner which closely approximates an ideal mounting since the only contact with the element is at peripheral edge points. Thus, the element's movement at these mounting or contact points is limited in the plane normal to its upper and lower surfaces while being virtually unrestrained transversely.

A better understanding of the present invention may be had from the following detailed description when read in conjunction with the accompanying drawings, in which.

Figure 4:
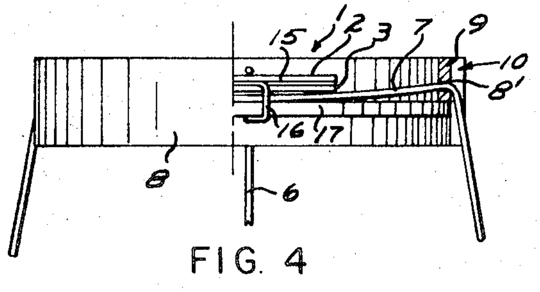
FIG. 4 is a view taken along the line 4—4 of FIG. 1.
Figure 5:
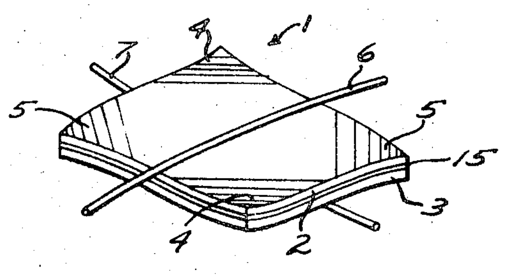
FIG. 5 is a perspective view of a twister type of piezoelectric element mounted according to the present invention illustrating the manner in which the mounted element flexes and vibrates.

Referring to the drawings in more detail, there is shown a flexing type of piezoelectric element 1. The element 1 is preferably made by securing together face to face a pair of identical face-shear plates of piezoelectric material, 2 and 3. The piezoelectric plates 2 and 3 are rectangular in shape, preferably being square, and are secured together in such a manner that a voltage across the thickness of the plates causes the plates 2 and 3 to deform in opposite directions on their opposite major surfaces. As shown in FIG. 4, the face-shear plates 2 and 3 making up the element 1 deform or flex by twisting and in this twisting movement the diagonally opposite corners 4 move in a direction exactly opposite to the movement of the diagonally opposite corners 5. In FIG. 5, the piezoelectric element 1 is shown at an instant during which the corners 4 are bent upward while the corners 5 are turned downward.

One piezoelectric element suitable for use as the element 1 is manufactured by the Clevite Corporation under the trade name "Bimorph," and more specifically is their twister type of "Bimorph." A further understanding of a "Bimorph" flexing type piezoelectric element may be had by referring to Clevite's manual Piezoelectric Technology, Data for Designers, which manual was published in 1965. In particular, pages 4–6 of the Clevite manual relate to "Bimorphs."

The piezoelectric element 1 which has a four sided peripheral edge is mounted by means of two wirelike elements or wires 6 and 7 in an annular frame or ring 8. The ring 8 is made of a nonconductive material and has a uniform inner rim 9 formed around its upper edge. Slots 10 are cut longitudinally 90° apart in the ring 8 for receiving the ends of the wires 6 and 7. The element 1 is mounted in the frame 8 by running the wires 6 and 7 from adjacent slots 10 to communicate with the slots directly opposite. The wires 6 and 7 are forced through an opening 8' in the rim portion 9 of the frame 8 and the rim 9 acts to hold the wires 6 and 7 in fixed positions. Further, the substantially straight wires 6 and 7 are bent at the point they leave the rim 9 and enter the slot 10 to prevent the wires 6 and 7 from moving relative to the frame 8.

With the wires 6 and 7 thus mounted in the frame 8, they extend substantially straight and perpendicular to each other with the wire 6 crossing just over the wire 7. It is noted that the deflection between the straight wires 6 and 7 is designed to be just large enough to permit the insertion of the piezoelectric element 1 therebetween so that the wires 6 and 7 are placed under tension by the element 1 and thus act to clamp the element 1 securely in place. In other words, the openings 8' lie in the same plane and the resilient straight wires 6 and 7 are deflected slightly at their point of crossing before the element 1 is inserted therebetween so that insertion of the element 1 therebetween places the wires 6 and 7 under tension. The piezoelectric element 1 when appropriately mounted between the wires 6 and 7 has its center positioned approximately at the point of intersection of the wires 6 and 7 and has the approximate midpoints of each of its sides aligned with either the wire 6 or the wire 7. The wires 6 and 7, since they are forced apart and thus put under tension by the element 1, contact the element 1 only at the midpoints of its peripheral edges. The upper wire 6 is bent upward away from the element 1 and contacts the piezoelectric plate 2 at opposite peripheral edge points midway between corners 4 and 5. Similarly, the lower wire 7 is bent downward away from the element 1 and contacts the piezoelectric plate 3 at opposite peripheral edge points midway between corners 4 and 5 which contact points are displaced 90° away from the contact points of the upper wire 6.

With the piezoelectric element 1 correctly clamped between the wires 6 and 7 in accordance with the invention, the mounted element 1 is ready for mounting in a transducer assembly. Before describing the transducer assembly, however, it must be first pointed out that the piezoelectric plates 2 and 3 may be connected electrically either in parallel or series. Further, it is noted that whether the plates 2 or 3 are to be connected in parallel or series is determined at the time of manufacturing the element 1 in order to properly orientate the plates 2 and 3 at the time they are assembled.

Figure 1:
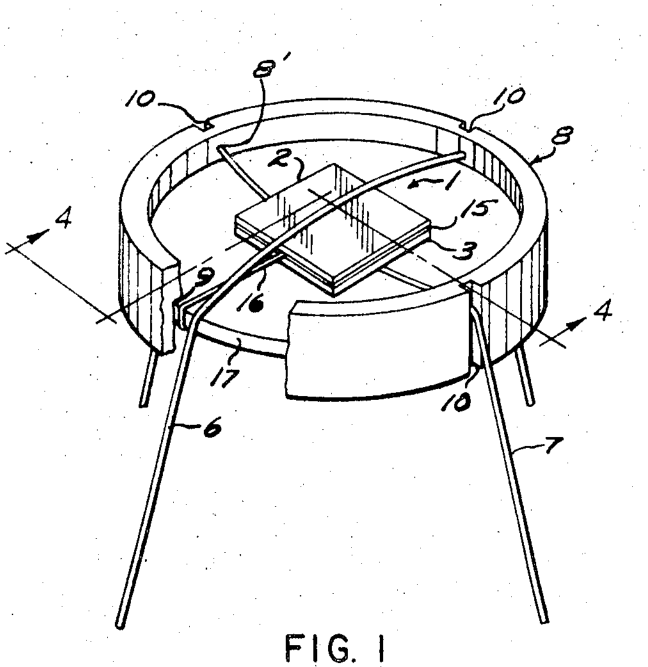
FIG. 1 is a perspective view of a mounting arrangement according to the present invention illustrating a twister type of piezoelectric element having two plates mounted therein with the piezoelectric plates connected electrically in parallel.

A piezoelectric element 1 designed for parallel connection is shown in FIGS. 1 and 4. In order to accomplish the parallel connection of the plates 2 and 3, an electrode 15 is included in the element 1. The electrode 15 is sandwiched between the plates 2 and 3 and has a lead or conductor 16 connected thereto. The mounted piezoelectric element 1 may then be connected with its plates 2 and 3 in parallel by connecting the wires 6 and 7 to one terminal of a transducer and the conductor 16 to its other terminal. As shown in FIGS. 1 and 4, the parallel connection of the plates 2 and 3 is accomplished by connecting the conductor 16 to a conductive metal plate 17 which is sized and designed for insertion in the frame 8 against the lower edge of the rim 9 out of contact with either of the mounting wires 6 and 7 within slots 10. The wires 6 and 7 which serve as electrodes by making electrical contact with the plates 2 and 3, respectively, are bent at the points they exit the rim 9 to extend downward and slightly outward from the frame 8 within slots 10. Thereby, as is hereinafter described, the wires 6 and 7 are spring biased outward just enough to make good electrical contact with the sides of the electrically conductive transducer housing 20 in which the frame 8 is to be mounted. In this manner the wires 6 and 7 are electrically connected in common.

Figure 2:
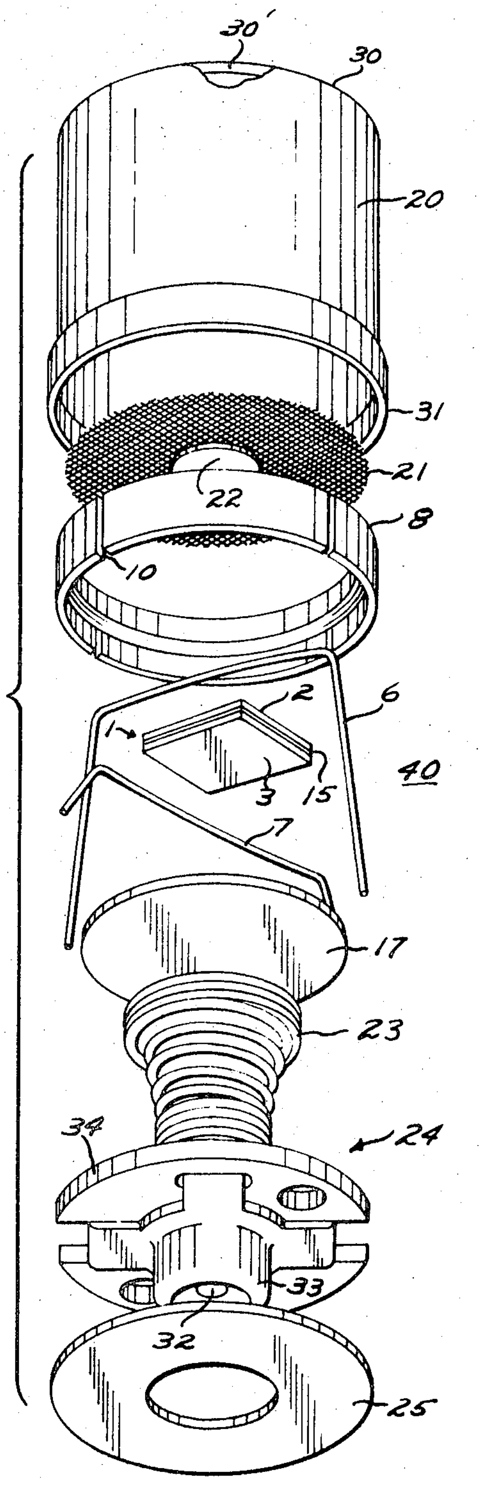
FIG. 2 is an exploded perspective view of a transducer assembly according to the present invention which includes the mounting arrangement of FIG. 1.
Figure 3:
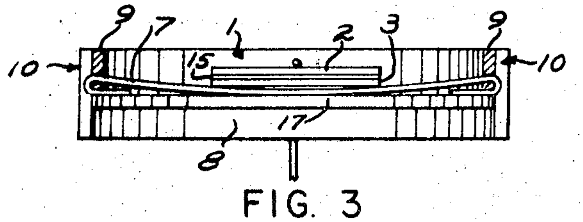
FIG. 3 is a side view of the mounting arrangement of FIG. 1 illustrating a twister type of piezoelectric element having two plates mounted therein with the piezoelectric plates connected electrically in series.

A piezoelectric element designed for series connection is shown in FIGS. 2 and 3. An electrode 15 may be included between the plates 2 and 3, but the only function it serves is to electrically connect the facing surfaces of the plates 2 and 3 in common. To accomplish the series connection of the plates 2 and 3, the wire 7 is bent back upon itself at its ends so that it extends through and then back under the rim 9. Thereby, the conductive plate 17 inserted in the frame 8 against the lower edge of the rim 9 contacts the bent over ends of the wire 7 to make good electrical connection therewith. The wire 6 is bent in the same manner as above described for the parallel connection of the plates 2 and 3 so as to be spring biased outward just enough to make good electrical contact with the sides of the transducer housing 20 in which the frame 8 is to be mounted.

Referring now to FIG. 2, an exploded view of a piezoelectric transducer assembly 40 is there shown. The assembly includes the electrically conductive housing 20, a screen 21 with a phase shifting circular disc 22 centrally mounted thereon, the frame 8, wires 6 and 7, one of the piezoelectric elements 1, the conductive plate 17, a conductive spring 23, an electrical terminal means 24 and a conductive bottom plate or disc 25. The housing 20 is substantially cylindrical in shape and is open at both ends 30 and 31. The upper end 30 of the housing 20 is constructed with an inturned lip 30' to receive and hold the screen 21 and the screen 21 is circularly cut to just fit therein. To assemble the transducer assembly, the screen 21 is inserted in the housing 20 and the frame 8, with a piezoelectric element 1 appropriately mounted therein by wires 6 and 7, is placed against the screen 20. The plate 17 is next positioned in the frame 8 to contact either the wire 9 or the bent over ends of the wire 7, depending on whether a parallel or series connected element 1 is mounted in the frame 8. The electrical terminal means 24 with the spring 23 attached thereto is then inserted in the housing 1 so that the spring 23 pushes the plate 17, frame 8 and screen 21 against the lip 30' of housing end 30. To complete the assembly, the disc 25 is fitted around the terminal means 24 and the housing end 31 is crimped over so that the transducer assembly is secured in its assembled condition.

It is noted that the terminal means 24 defines both electrical terminals of the transducer assembly. One of these electrical terminals is formed by the inner female plug-in portion 32 of the terminal means 24. The plug-in portion 32 is electrically connected to the conductive plate 17 through the conductive spring 23. The other transducer terminal is formed by the outer conductive casing portion 33 which protrudes from the nonconductive, substantially disc shaped mounting structure 34 of the terminal means 24. The casing portion 33 is insulated from the plug-in terminal 32 and is electrically connected to the conductive housing 20 by the conductive disc 25.

In operation, the transducer assembly and mounted piezoelectric element 1 may function to either generate or sense sonic wave energy. In sensing such waves, the waves pass through the screen 21 and cause the piezoelectric element 1 to vibrate as shown in FIG. 5, thereby to generate an electrical output across the terminals 32 and 33. The dot-like or circular disc 22 which is held by the screen 21 adjacent the upper surface of element 1 functions to create a flow restriction thereby to phase shift the waves received so that destructive major surfaces of the element 1 is substantially eliminated. The screen 21, in addition to providing structure for supporting the dot-like disc 22 centrally over the element 1, also serves to protect the piezoelectric element 1. It is noted that the dot-like disc 22 preferably has a diameter which may be equal to or less than about two-thirds the length of one of the sides of the square element 1. With the element 1 mounted in accordance with the present invention, such a dimensional disc 22 has been found to provide the necessary phase shift. In the generation of a sonic output a procedure which is the reverse to the one just described above is used wherein electrical signals are applied to the transducer terminals 32 and 33 to excite the piezoelectric element 1 through its electrodes. Thereby, the element 1 is caused to flex as shown in FIG. 5 to generate a sonic output which is emitted through the screen 21 by passage around the physical flow restriction provided by the phase shifting dot-like or circular disc 22.

It is noted that the electrical paths of conduction between the transducer terminals 32 and 33 and the element's electrodes are defined in the assembled transducer, as follows: from the terminal 32 through the spring 23 and the plate 17 to the wire 7 or the wire 16; and from the terminal 33 through the disc 25 and the housing 20 to the wire 6 and in some cases to the wire 7. It is also noted that the wirelike elements 6 and 7 by contacting the piezoelectric element 1 at peripheral edge points midway between its corners thereby contact the element 1 at nodes, i.e., at points substantially free of any flexing motion normal to the element's upper and lower major surfaces. Further, the wires 6 and 7 make a substantially lateral type of contact at these points with the element l, thereby to permit the element 1 to move transversely in a virtually unrestrained manner when flexing. Thus, an arrangement for mounting the element 1 is provided which closely approximates an ideal mounting and it is noted that the term wirelike member is used herein in a broad sense to include all types of equivalent mounting structure, such as suitable filaments, wires, rods. etc.

Therefore, an improved arrangement for mounting a piezoelectric element is provided which enhances and improves the performance characteristics and sensitivity of the mounted piezoelectric element. Further, an improved piezoelectric transducer assembly is provided which incorporates the improved mounting arrangement.

What is claimed is:

1. A mounted substantially flat piezoelectric element having a four sided peripheral edge, comprising:
 a frame;
 a substantially flat piezoelectric element having two faces; and,
 first and second substantially straight wirelike members holding said piezoelectric element under mechanical bias therebetween, said wirelike members being mounted in said frame to cross each other said wirelike members clamping said piezoelectric element therebetween by contacting said element only at points on its peripheral edge, said first wirelike member contacting said element at opposed points on one face at opposite sides of its peripheral edge, said second wirelike member contacting said element at opposed points on the other face at opposite and non-adjacent sides of its peripheral edge.

2. The invention recited in claim 1, wherein said first and second wirelike members are mounted in said frame to extend essentially perpendicularly to each other.

3. The invention recited in claim 1, wherein said wirelike members are electrically conductive whereby to function as electrodes.

4. A mounted substantially flat piezoelectric element having a peripheral edge and two opposite major surfaces, comprising:
 a frame;
 a substantially flat piezoelectric element; and
 first and second wirelike members holding said piezoelectric element in clamped relation therebetween, said wirelike members being mounted in said frame to cross each other, said wirelike members clamping said piezoelectric element therebetween by contacting said element only at points on its peripheral edge, said first wirelike member is bent and positioned to contact said element only at one opposed pair of peripheral edge points on one of its major surfaces and said second wirelike member is bent and positioned to contact said element only at the opposite opposed pair of peripheral edge points on its other major surface.

5. The invention recited in claim 4 wherein said first and second wirelike members are mounted in said frame to extend substantially perpendicular to each other, and are electrically conductive whereby to function as electrodes.

6. A transducer assembly, comprising:
 a housing having at least one open end for receiving and emitting acoustical waves therethrough;
 a sonic flow restriction mounted in the open end of said housing;
 a substantially flat piezoelectric element having a peripheral edge and two opposite major surfaces;

structure mounting said element in said housing adjacent said flow restriction so that destructive interference at the major surfaces of said element is substantially eliminated by said flow restriction, said structure including first and second wirelike members holding said piezoelectric element in clamped relation therebetween, said wirelike members being mounted to cross each other, said first wirelike member is bent and positioned to contact said element only at one opposed pair of peripheral edge points on one of its major surfaces and said second wirelike member is bent and positioned to contact said element only at the opposite opposed pair of peripheral edge points on its other major surface;

a pair of electrical output terminals; and means for connecting said terminals electrically to said element so that electrical signals may be sensed thereon or applied thereto.

7. The invention recited in claim 6, wherein said first and second wirelike members are substantially straight and mounted to extend substantially perpendicular to cross each other and are electrically conductive electrodes.

8. The invention recited in claim 7, wherein said element is made of two rectangular piezoelectric plates sandwiched together, and said flow restriction is a circular disc which is positioned centrally relative to one surface of said element.

9. The invention recited in claim 8, wherein said element has its plates electrically connected in series.

10. The invention recited in claim 8, wherein said element has its plates electrically connected in parallel.

11. A transducer assembly, comprising:

a housing having at least one open end for receiving and emitting sonic waves therethrough;

a sonic flow restriction mounted in the open end of said housing;

a substantially flat, rectangular shaped piezoelectric element having a four sided peripheral edge and two major surfaces, said element being of a twister flexing type;

structure mounting said element in said housing adjacent said flow restriction so that destructive interference at the major surfaces of said element is substantially eliminated by said flow restriction, said structure including first and second wirelike members mounted to cross perpendicularly with respect to each other, said wirelike members holding said element in clamped relation therebetween by contacting said element only at points on its peripheral edge, said first wirelike member is bent and positioned to contact said element at one opposed pair of peripheral edge points on one of its major surfaces midway between the corners of two opposite sides of its peripheral edge, said second wirelike member is bent and positioned to contact said element at the opposite opposed pair of peripheral edge points on the other of its major surfaces midway between the corners of the two other opposite sides of its peripheral edge;

a pair of electrical output terminals; and means for connecting said terminals electrically to said element so that electrical signals may be sensed thereon or applied thereto.

12. In a piezoelectric transducer assembly, the improvement comprising:

a substantially flat shaped piezoelectric element having a four sided peripheral edge and two major surfaces, said element being of a twister flexing type; and structure mounting said element in said transducer assembly including first and second wirelike members mounted to cross perpendicularly with respect to each other, said wirelike members holding said element in clamped relation therebetween by contacting said element only at points on its peripheral edge, said first wirelike member is bent and positioned to contact said element at one opposed pair of peripheral edge points on one of its major surfaces midway between the corners of two opposite sides of its peripheral edge, said second wirelike member is bent and positioned to contact said element at the opposite opposed pair of peripheral edge points on the other of its major surfaces midway between the corners of the two other opposite sides of its peripheral edge.

13. The invention recited in claim 12, wherein said wirelike members are electrically conductive whereby to function as electrodes.

* * * * *